United States Patent Office 3,780,124
Patented Dec. 18, 1973

3,780,124
MOLECULAR SIEVE 13X CATALYZED ISOMERIZATION OF α-PINENE—IMPROVEMENT OF CATALYST ACTIVITY BY IODINE
Curry Beach Davis, Panama City, Fla., assignor to Arizona Chemical Company, New York, N.Y.
No Drawing. Filed Feb. 26, 1973, Ser. No. 335,843
Int. Cl. C01b 33/28; C07c 13/00; C09f 3/02
U.S. Cl. 260—675.5                         8 Claims

ABSTRACT OF THE DISCLOSURE

α-Pinene, β-pinene, or turpentine is isomerized at temperatures ranging from about 140° C. to 200° C. in the presence of a potassium 13X zeolite-iodine catalyst mixture to yield predominantly dipentene and minor amounts of terpinolene and camphene.

---

This invention relates to an improved process for the isomerization of terpenes. More particularly, it relates to the production of dipentene by the isomerization of terpenes, such as turpentine or α-pinene, by heating the latter in the presence of a selective catalyst mixture. More particularly, it relates to the isomerization of α-pinene or turpentine by means of a potassium 13X zeolite-iodine catalyst mixture to obtain dipentene in good yield and purity.

Dipentene is an important article of commerce and is in great demand for the production of terpene resins used in hot-melt coatings, pressure-sensitive adhesives, and the like. However, in the prior art, many examples for manufacturing dipentene by isomerizing α-pinene are disclosed. Thus, in U.S. Pat. No. 2,382,641 to Kharasch and Reynold, there is taught the conversion of optically active α-pinene to limonene which is the optically active form of dipentene by heating the same with an organic acid, such as benzoylbenzoic acid or salicyclic acid, in the presence of an amide, such as formamide or acetamide, at temperatures ranging from about 140° C. to 200° C. for 15 to 50 hours. Unfortunately, this process is not wholly satisfactory, since it involves the utilization of substantial quantities of expensive organic acids and amides as well as extremely lengthy times for effecting isomerization. Moreover, in the Frilette and Weisz patent, Pat. No. 3,140,322, there is shown the use of 10X zeolite to reduce polymer formation in the isomerization of α-pinene to yield camphene as the major product.

In discussing the activity of 13X molecular sieves in the Journal of the American Chemical Society, vol. 64, p. 382, the authors state that α-pinene will not undergo any reaction wsen refluxed with the Na+ form (the 13X form), but when refluxed with the calcium salt is converted extensively to camphene.

Derfer and Bordenca, in U.S. Pat. 3,270,075 teach the isomerization of α-pinene to yield a dipentene-rich isomerizate with a 10X or 13X zeolite at a temperature in the range of about 65° C. However, patentees specifically warn against using higher temperatures. For example, at column 8, line 24 ff., it is stated therein that when temperatures of about 135° C. to 154° C. are employed, considerably more camphene is produced and in most instances camphene becomes the predominant product. Furthermore, patentees in Example 1, at column 6, line 20 ff., state that when α-pinene is treated at 150° C. with a 13X molecular sieve catalyst, the isomerizate obtained is found to contain only 10% of the desired product, namely, dipentene.

It is, therefore, a principal object of this invention to provide a straightforward process for producing dipentene from α-pinene or turpentine in high yield and in a relatively short period of time. A further object is to provide a process wherein the amount of undesirable products is minimized. These and other objects of the present invention will become apparent from a reading of the ensuing description.

It has been unexpectedly found, in accordance with the process of the present invention, that high yields of dipentene can be obtained by isomerizing either pinene or turpentine at temperatures of about 140° C. to about 200° C., employing a potassium 13X zeolite-iodine catalyst mixture in amounts ranging from about 0.1% to about 10%. In so proceeding there is thereby formed major amounts of dipentene, but only minor amounts of terpinolene and camphene as by-products. Advantageously, the catalyst mixture can be readily regenerated for further use.

The potassium form of 13X zeolite is prepared from the corresponding well-known sodium form. The latter is characterized as a molecular sieve having the structure: $Na_{86}(AlO_2)_{86}(SiO_2)_{106}$ and possessing an effective pore diameter of about 13 angstroms. To prepare the potassium form of the 13X molecular sieve, the sodium form of 13X molecular sieve is contacted with a sufficient amount of an aqueous solution of a potassium halide, such as potassium chloride, potassium bromide or potassium iodine to replace the sodium ions with potassium ions. Resultant treated 13X molecular sieve is next washed with water and dried. To the so-obtained catalyst is then added either prior to or during isomerization from about 0.0025% to about 10% of iodine, based on the weight of the potassium catalyst.

The terpenes which may be used in the practice of the instant invention contemplate α-pinene and β-pinene, as well as turpentine.

The isomerization process of the present invention is generally carried out at temperatures of 140° C.–200° C. Preferred reaction temperatures are in the range of 150° C. to 175° C. In general, reaction times of from 0.5 hour to not more than 15 hours are employed. The process may be carried out either batch-wise or continuously, and under atmospheric, superatmospheric or subatmospheric pressures. It has been found that the isomerization reaction proceeds at a significantly faster rate when the zeolite catalyst has been admixed with elemental iodine.

In a preferred embodiment of the process of this invention, α-pinene is heated at reflux (i.e., 150° C.) with about 0.25%–2% of the potassium form of 13X molecular sieve-iodine catalyst mixture and for about 0.5 to 8 hours. The resulting isomerizate is then filtered to remove the catalyst mixture which is then recycled. The isomerizate is fractionated by any method well known in the art.

The following examples further illustrate the present invention and are not intended to limit the scope thereof in any manner.

EXAMPLE 1

One hundred grams of α-pinene, 1.0 gram of dry potassium ion exchanged 13X molecular sieve catalyst, and 20 milligrams of elemental iodine are charged into a 500 ml., three-neck, round-bottom flask. The reaction mixture is blanketed with nitrogen and agitated with a magnetic stirrer. This reaction mixture is rapidly heated to reflux and maintained at from 157° C. to 175° C., during the course of the isomerization. Four aliquots are removed periodically and chromatographically analyzed, indicating conversion to about 65% dipentene within about 2.5 hours. The data obtained is recorded in Table 1.

TABLE I

| | Composition of isomerization (assay), percent | | | | | |
|---|---|---|---|---|---|---|
| | $\alpha$-Pinene | Camphene | $\alpha$-Terpinene | Dipentene | $\gamma$-Terpinene | Terpinolene |
| Reaction time (in hrs.): | | | | | | |
| 0.5 | 60.1 | 8.5 | 0.3 | 27.2 | 0.5 | 2.1 |
| 1.0 | 35.6 | 12.4 | 0.7 | 45.7 | 0.8 | 3.6 |
| 1.5 | 22.0 | 14.7 | 1.0 | 55.5 | 1.0 | 4.6 |
| 2.5 | 8.7 | 16.6 | 1.4 | 64.8 | 1.2 | 6.1 |

EXAMPLE 2

100-gram sample of $\alpha$-pinene is isomerized employing the same procedure as in Example 1 above, except that no iodine is added to the potassium form of 13X molecular sieve catalyst. Analysis of five aliquots from this reaction are tabulated in Table II below. It will be noted that 64.5% dipentene is formed only after some 94 hours subsequent to commencing the isomerization reaction.

The final product is cooled and slurried with 678 pounds of water. The resultant heterogenous slurry is filtered and the catalyst cake washed with an additional 750 pounds of water. The filtrate is separated to recover the isomerizate.

The hydrated sieve catalyst is recovered and recycled. The potassium ion exchanged-iodine catalyst mixture can be cycled through ten isomerizations with no significant loss in activity.

TABLE II

| | Composition of isomerization (assay), percent | | | | | |
|---|---|---|---|---|---|---|
| | $\alpha$-Pinene | Camphene | $\alpha$-Terpinene | Dipentene | $\gamma$-Terpinene | Terpinolene |
| Reaction time (hrs.): | | | | | | |
| 27.5 | 57.3 | 8.4 | 0.2 | 30.5 | 0.4 | 1.9 |
| 44 | 41.0 | 11.0 | 0.4 | 42.7 | 0.5 | 2.8 |
| 56 | 32.2 | 12.3 | 0.4 | 49.8 | 0.6 | 3.3 |
| 69 | 17.9 | 14.0 | 0.8 | 60.7 | 0.9 | 4.5 |
| 94 | 13.6 | 14.1 | 0.9 | 64.5 | 0.8 | 5.0 |

EXAMPLE 3

Two thousand pounds of commercial $\alpha$-pinene and 37 pounds of wet potassium form of 13X molecular sieve were charged into a 500-gallon reactor. The resultant heterogeneous mixture is heated to reflux, and the vapors are carried to a condenser and returned through a water separator. Reflux temperatures are maintained so as to dry the sieve catalyst. The dry catalyst and $\alpha$-pinene slurry are then cooled to about 50° C., at which temperature 0.4 pound of elemental iodine is added. The mixture is again heated to reflux and maintained at reflux during the course of the isomerization. Aliquots are removed and chromatographically analyzed to monitor the course of the isomerization. Analysis of four aliquots from the reaction are tabulated in Table III below. It will be seen after some 3.3 hours, 61.3% dipentene is formed.

I claim:
1. A method for producing dipentene which comprises the steps of: isomerizing a pinene containing feed at a temperature from about 140° C. to about 200° C. in the presence of a potassium 13X zeolite-iodine catalyst mixture.
2. The method of claim 1 wherein said feed is predominantly $\alpha$-pinene.
3. The method of claim 2 wherein said feed is predominantly $\beta$-pinene.
4. The method of claim 1 wherein said feed is turpentine.
5. The method of claim 1 wherein the amount of the potassium 13X zeolite-iodine catalyst mixture is present from about 0.25 to 2%, based on the weight of the feed.
6. The method of claim 1 wherein the reaction time ranges from about 0.5 to 15 hours.

TABLE III

| | Composition of isomerization (assay), percent | | | | | |
|---|---|---|---|---|---|---|
| | $\alpha$-Pinene | Camphene | $\alpha$-Terpinene | Dipentene | $\gamma$-Terpinene | Terpinolene |
| Reaction time (hrs.): | | | | | | |
| 0.5 | 82.6 | 4.4 | 0.2 | 10.0 | 0.2 | 0.8 |
| 1.3 | 60.9 | 8.4 | 0.5 | 26.5 | 0.5 | 2.1 |
| 2.2 | 30.2 | 13.4 | 0.9 | 49.4 | 0.8 | 4.1 |
| 3.3 | 12.5 | 14.6 | 1.3 | 61.3 | 1.1 | 6.0 |

7. The method of claim 1 wherein said temperature is from about 150° C. to 175° C.

8. The method of claim 5 wherein said iodine is present in an amount ranging from about 0.0025% to about 10%, based on the weight of the potassium 13X zeolite.

References Cited

UNITED STATES PATENTS

| | | | |
|---|---|---|---|
| 2,382,641 | 8/1945 | Kharasch et al. | 260—675.5 |
| 3,140,322 | 7/1964 | Frilette et al. | 260—667 |
| 3,270,075 | 8/1966 | Derfer et al. | 260—675.5 |
| 3,278,623 | 10/1966 | Derfer | 260—675.5 |
| 3,642,928 | 2/1972 | Davis | 260—675.5 |
| 3,696,164 | 10/1972 | Davis | 260—675.5 |
| 3,700,746 | 10/1972 | Takacs | 260—675.5 |
| 3,700,747 | 10/1972 | Takacs | 260—675.5 |

DELBERT E. GANTZ, Primary Examiner

G. E. SCHMITKONS, Assistant Examiner

U.S. Cl. X.R.

208—Dig. Z; 252—441, 442; 260—666 A, 683.68, 683.75